(12) United States Patent
Takahashi et al.

(10) Patent No.: US 7,956,909 B2
(45) Date of Patent: Jun. 7, 2011

(54) NOISE REDUCING DEVICE, ELECTRONIC CAMERA, AND IMAGE PROCESSING PROGRAM FOR REDUCING IMAGE NOISE BY USING BLACKOUT IMAGE

(75) Inventors: Kazuhiro Takahashi, Kawasaki (JP); Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/805,915

(22) Filed: Aug. 24, 2010

(65) Prior Publication Data
US 2010/0321541 A1   Dec. 23, 2010

Related U.S. Application Data

(62) Division of application No. 11/408,984, filed on Apr. 24, 2006, now Pat. No. 7,804,532.

(30) Foreign Application Priority Data

Apr. 27, 2005  (JP) ................................. 2005-129831
May 19, 2005  (JP) ................................. 2005-146749

(51) Int. Cl.
  *H04N 9/64* (2006.01)
  *H04N 5/217* (2011.01)
(52) U.S. Cl. ..................... 348/243; 348/241; 348/244
(58) Field of Classification Search ................ 348/241, 348/243, 244, 245, 251, 222.1, 246
See application file for complete search history.

(56) References Cited

U.S. PATENT DOCUMENTS

| | | | |
|---|---|---|---|
| 5,729,288 A * | 3/1998 | Saito | ............................. 348/243 |
| 6,118,115 A | 9/2000 | Kozuka et al. | |
| 6,535,617 B1 | 3/2003 | Hannigan et al. | |
| 6,538,695 B1 | 3/2003 | Xiao et al. | |
| 6,710,807 B1 | 3/2004 | Yamagishi | |
| 6,888,568 B1 | 5/2005 | Neter | |
| 6,974,973 B2 * | 12/2005 | Rossi et al. | ..................... 257/72 |
| 6,982,757 B2 | 1/2006 | Tariki | |
| 7,280,141 B1 | 10/2007 | Frank et al. | |
| 7,280,705 B1 | 10/2007 | Frank et al. | |
| 7,432,965 B2 | 10/2008 | Mori | |
| 7,567,277 B2 | 7/2009 | Inaba et al. | |

(Continued)

FOREIGN PATENT DOCUMENTS

JP     A 06-253206     9/1994

(Continued)

OTHER PUBLICATIONS

Office Action issued in JP Application No. 2005-146749 on Apr. 13, 2010 (with English translation).

(Continued)

*Primary Examiner* — Lin Ye
*Assistant Examiner* — Marly Camargo
(74) *Attorney, Agent, or Firm* — Oliff & Berridge, PLC

(57) ABSTRACT

A noise reducing device captures image data obtained by capturing a field with an image capturing part and a plurality of blackout image data obtained by capturing the field with the image capturing part under a light shielded state. This device reduces non-correlative random noise in the plural blackout image data. With random noise reduced, fixed pattern noise appears more accurately in resultant as blackout image data B. This device reduces the fixed pattern noise in the image data by using this blackout image data B.

5 Claims, 6 Drawing Sheets

U.S. PATENT DOCUMENTS

| | | | |
|---|---|---|---|
| 7,692,699 B2 * | 4/2010 | Kobayashi | 348/244 |
| 7,804,532 B2 * | 9/2010 | Takahashi et al. | 348/243 |
| 2004/0051797 A1 * | 3/2004 | Kelly et al. | 348/244 |
| 2005/0259166 A1 * | 11/2005 | Tsuda et al. | 348/241 |
| 2007/0146508 A1 | 6/2007 | Oshima | |

FOREIGN PATENT DOCUMENTS

| | | |
|---|---|---|
| JP | A 08-051571 | 2/1996 |
| JP | A 2000-125204 | 4/2000 |
| JP | 2003116064 A * | 4/2003 |
| JP | A-2003-116064 | 4/2003 |
| JP | A 2004-040233 | 2/2004 |
| JP | 2004248006 A * | 9/2004 |
| JP | A 2004-248006 | 9/2004 |

OTHER PUBLICATIONS

Japanese Notification of Reasons for Refusal for Application No. 2005-129831, dated Nov. 16, 2010 w/English translation.

* cited by examiner

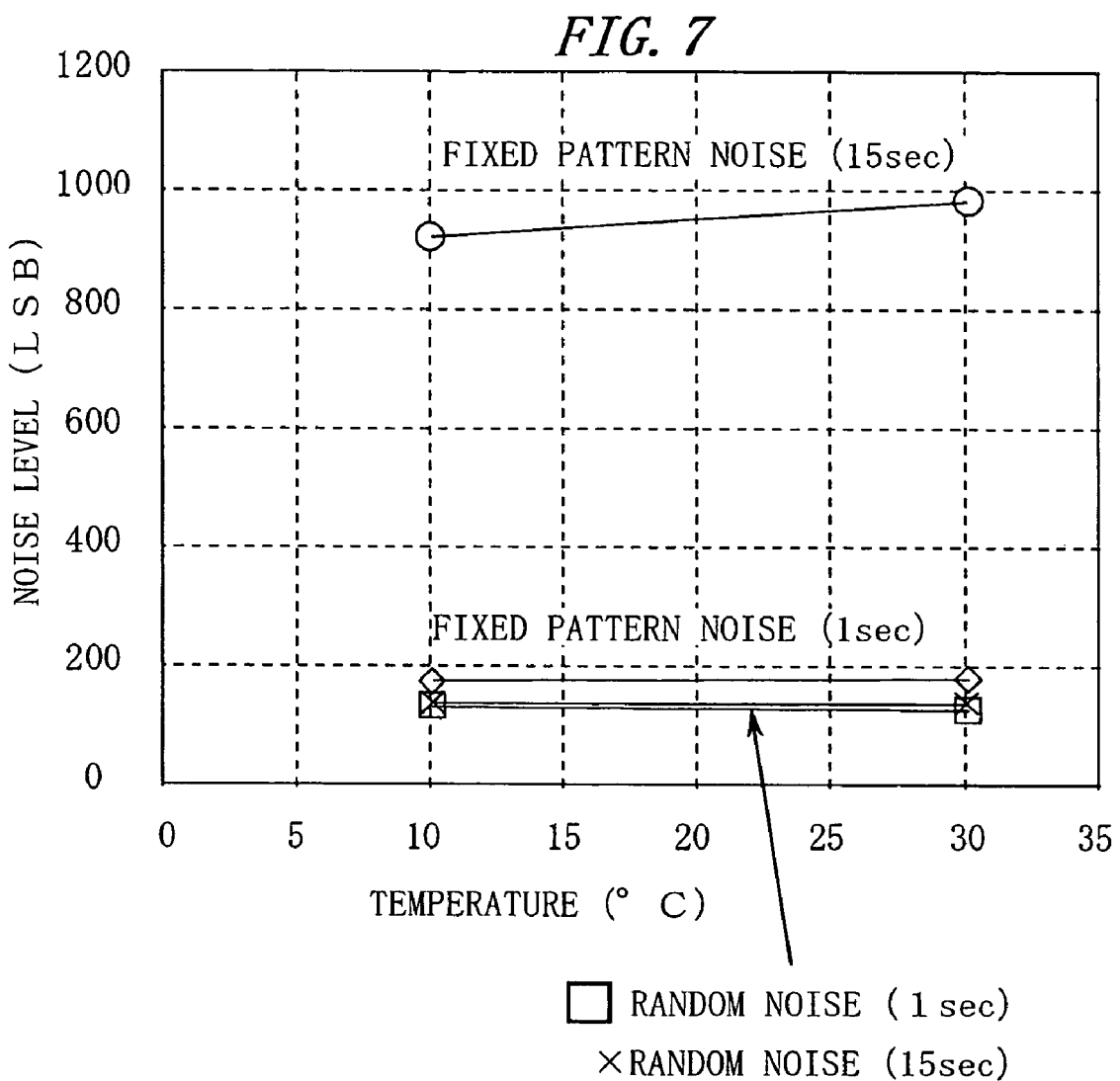

NOISE REDUCING DEVICE, ELECTRONIC CAMERA, AND IMAGE PROCESSING PROGRAM FOR REDUCING IMAGE NOISE BY USING BLACKOUT IMAGE

CROSS REFERENCE TO RELATED APPLICATION

This is a Division of application Ser. No. 11/408,984 filed Apr. 24, 2006, which is based upon and claims the benefit of priority from Japanese Patent Application No. 2005-129831, filed on Apr. 27, 2005, and No. 2005-146749, filed on May 19, 2005, the entire contents of which are incorporated herein by reference.

BACKGROUND OF THE INVENTION

1. Field of the Invention

The present invention relates to a noise reducing device, an electronic camera and an image processing program for reducing image noise by using a blackout image.

2. Description of the Related Art

Fixed pattern noise generally appears in image data obtained through long-exposure shooting with an electronic camera. There is a known device for removing this type of noise disclosed in Japanese Unexamined Patent Application Publication No. 2000-125204.

This conventional device first prepares image data that is normally captured and blackout image data that is captured while a shutter is closed. Next, it subtracts the blackout image data from the image data in each pixel, to common-mode reject the fixed pattern noise.

However, the blackout image data captured through the long-exposure shooting includes random noise in addition to the fixed pattern noise. Therefore, the aforesaid the conventional device has a problem in the subtraction processing that the random noise is reversed in phase and added to the image data, resulting in increasing noise in the image data unintentionally.

SUMMARY OF THE INVENTION

It is an object of the present invention to provide a technique to reduce the influence of random noise for noise reduction using a blackout image. Hereinafter, the present invention will be described.

<<1>> A noise reducing device of the present invention includes an input part, a blackout image processing part, and a noise reducing part. The input part captures image data obtained by capturing an optical image with an image capturing part and a plurality of blackout image data obtained by capturing the optical image with the image capturing part under a light shielded state. The blackout image processing part reduces non-correlative random noise in the plural blackout image data to generate blackout image data B. The noise reducing part reduces noise in the image data according to the blackout image data B.

The aforesaid plural blackout image data are obtained from the same image capturing part, so that they have similar fixed pattern noises. Therefore, the fixed pattern noises in the plural blackout image data have high correlativity. On the other hand, the random noises occur in the plural blackout image data at random. Therefore, the random noises in the plural blackout image data have non-correlativity.

Accordingly, comparing the plural blackout image data makes it possible to accurately discriminate the non-correlative random noise from the correlative fixed pattern noise.

According to the present invention, the blackout image data B with the random noise reduced through this correlativity discrimination is generated. Using the blackout image data B as a reference, the fixed pattern noise in the image data is reduced. As a result, it is possible to appropriately reduce the fixed pattern noise in the image data while inhibiting an adverse effect of increase in the random noise.

<<2>> Preferably, the blackout image processing part detects a non-correlative portion of the plural blackout image data according to level variation therein. The blackout image processing part obtains the blackout image data B by applying variation reduction to the non-correlative portion of a composite image of the plural blackout image data.

<<3>> Preferably, the blackout image processing part detects a micro-level portion in which levels of all the plural blackout image data are equal to or lower than a predetermined threshold value. The blackout image processing part obtains the blackout image data B by applying variation reduction to the micro-level portion of a composite image of the plural blackout image data.

<<4>> Preferably, a total charge storage time for the plural blackout image data is set shorter than that for the image data. In this case, the blackout image processing part multiplies the blackout image data B by a compensation gain which compensates gain decrease of the fixed pattern noise ascribable to the set shorter time.

<<5>> An electronic camera of the present invention includes an image capturing part, a light shielding mechanism, a control part, and a noise reducing device. The image capturing part performs photoelectric conversion. The light shielding mechanism has a function of shielding the image capturing part from light. The control part drives the image capturing part to capture an image of a field by and generate image data. Further, the control part drives, a plurality of times, the image capturing part shielded from light by the light shielding mechanism to generate a plurality of blackout image data. The noise reducing device is the device described in the above <<1>>. This noise reducing device captures the image data and the plural blackout image data to reduce noise in the image data.

<<6>> Another electronic camera of the present invention includes an image capturing part, a light shielding mechanism, a control part, and a noise reducing part. The image capturing part generates image data by photoelectric conversion. The light shielding mechanism shields the image capturing part from light. The control part drives the image capturing part to capture an image of a field and generate image data. Further, the control part drives the image capturing part shielded from light by the light shielding mechanism to generate blackout image data. The noise reducing part reduces fixed pattern noise in the image data based on the blackout image data.

In particular, for generation of the blackout image data, the above-described control part sets an image capturing condition under which a level difference between the fixed pattern noise and random noise increases.

On the other hand, in the conventional noise processing, it has been common knowledge for those skilled in the art that image capturing conditions for the blackout image data and for the image data are to be uniform as much as possible so as to equalize the amount of the fixed pattern noise in both of the data.

Accordingly, it has been preferable that the charge storage time for the blackout image data and that of the image data be set equal to each other. Further, it has been preferable that the image data and the blackout image data be generated continuously in order to prevent a great change in temperature of the image capturing part, as well as that imaging sensitivities of both of the data be set equal to each other.

However, the present inventors conducted an experiment of image capturing of blackout image data, and have found that a ratio of fixed pattern noise and random noise changes through intentional changes in the image capturing conditions. The present invention positively utilizes the finding. That is, on the contrary to the common knowledge of those skilled in the art, the image capturing condition is changed for generation of the blackout image data, thereby increasing a level difference between the fixed pattern noise and the random noise in the blackout image data.

Such increase in the level difference relatively increases the fixed pattern noise and relatively decreases the random noise. Therefore, making the level of the fixed pattern noise in the blackout image data equal to the level of the fixed pattern noise in the image data can reduce the random noise in the blackout image data. As a result, it becomes possible to reduce an adverse effect of the random noise when noise in the image data is reduced by using the blackout image data.

<<7>> Preferably, the control part increases the level difference between the fixed pattern noise and the random noise by setting a charge storage time for the blackout image data longer than that for the image data.

<<8>> Preferably, the control part increases the level difference between the fixed pattern noise and the random noise by setting a signal gain (hereinafter, imaging sensitivity) of the blackout image data higher than that of the image data.

<<9>> Preferably, the control part has a function of adjusting temperature of the image capturing part. The control part sets the temperature in generating the blackout image data higher than in generating the image data. This increases the level difference between the fixed pattern noise and the random noise.

<<10>> Preferably, the noise reducing part corrects a level difference in the fixed pattern noise between the blackout image data and the image data due to a change in the image capturing condition. After the level correction, the noise reducing part reduces the fixed pattern noise in the image data by subtracting the blackout image data from the image data.

<<11>> Preferably, the noise reducing part discriminates the fixed pattern noise from the random noise in the blackout image data according to a threshold level which is in accordance with the image capturing condition of the blackout image data. The noise reducing part reduces the fixed pattern noise in the image data according to the discriminated fixed pattern noise.

<<12>> An image processing program of the present invention causes a computer to function as the input part, the blackout image processing part, and the noise reducing part described in the above <<1>>.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 is a chart showing the relation of temperature vs. fixed pattern noise and random noise.

DESCRIPTION OF THE PREFERRED EMBODIMENTS

Hereinafter, embodiments of the present invention will be described in detail based on the drawings.

First Embodiment

Figure 1:
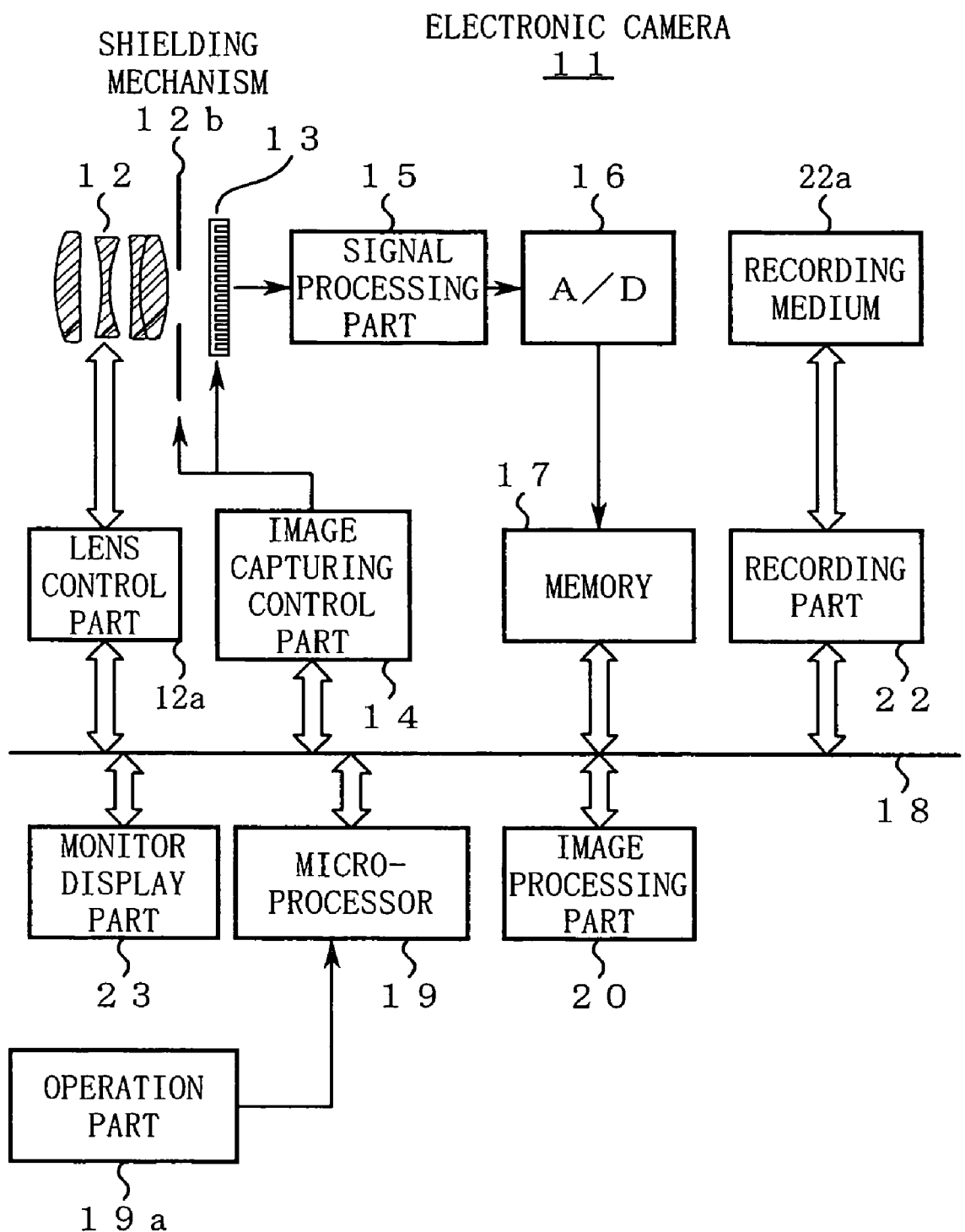
FIG. 1 is a block diagram showing an electronic camera 11.

FIG. 1 is a block diagram showing an electronic camera 11.

In FIG. 1, a photographing lens 12 is attached to the electronic camera 11. A lens control part 12a performs focus driving, aperture control, and so on of the photographing lens 12. In an image space of the photographing lens 12, a light receiving surface of an image sensor 13 is disposed via a shielding mechanism 12b. The shielding mechanism 12b may serve also as a mechanical shutter or an aperture, or may be a dedicated shielding mechanism. The shielding mechanism 12b has a function of closing an incident light path of the photographing lens 12 based on a signal from an image capturing control part 14 to shield the light receiving surface of the image sensor 13 from light.

The image sensor 13 is driven by the image capturing control part 14. Image data outputted from the image sensor 13 is processed in a signal processing part 15 and an A/D converter 16, and thereafter is temporarily stored in a memory 17.

The memory 17 is connected to a bus 18. The lens control part 12a, the image capturing control part 14, a microprocessor 19, an image processing part 20, a recording part 22, and a monitor display part 23 are also connected to the bus 18.

An operation part 19a such as a release button is connected to the aforesaid microprocessor 19. A recording medium 22a is loaded in the aforesaid recording part 22.

<<Description of Operation of First Embodiment>>

Figure 2:
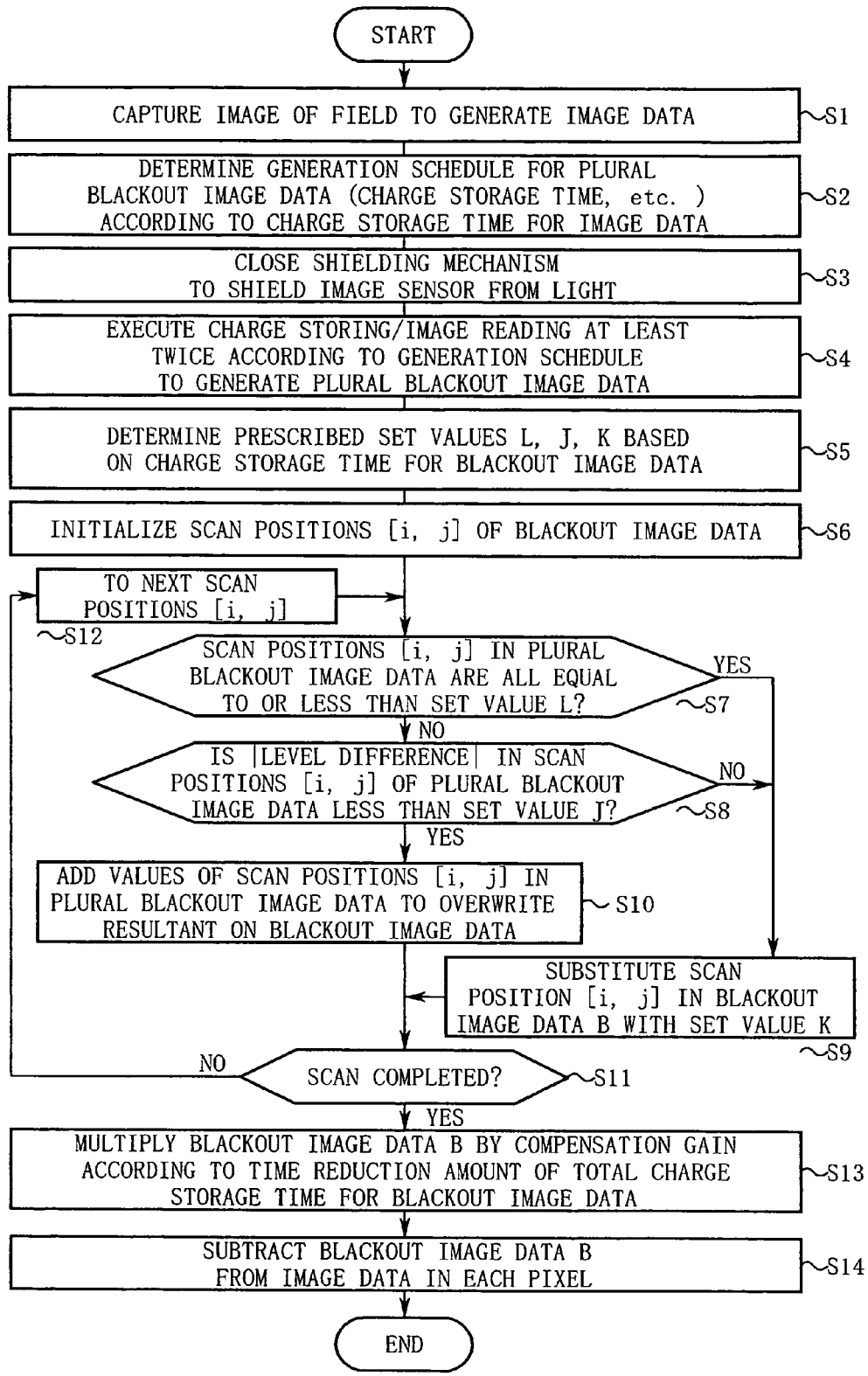
FIG. 2 is a flowchart to describe the operation of the first embodiment.

FIG. 2 is a flowchart to describe the operation of the first embodiment.

Hereinafter, the operation description will proceed following the step number shown in FIG. 2.

Step S1: When detecting a user's release instruction in the operation part 19a or the like, the microprocessor 19 instructs the image capturing control part 14 to start an image capturing operation. The image capturing control part 14 makes the image sensor 13 start the photoelectric conversion of a subject image while keeping the shielding mechanism 12b open, and after the elapse of a preset charge storage time, reads image data from the image sensor 13. This image data passes through the signal processing part 15 and the A/D converter 16 to be digitalized and thereafter, is temporarily stored in the memory 17.

Step S2: The microprocessor 19 determines a schedule for generating a plurality of blackout image data according to the charge storage time for the image data and instructs the image capturing control part 14 to generate the blackout image data.

For example, in a case where N (N≧2) pieces of the blackout image data are to be generated, a charge storage time for one blackout image data is preferably set to 1/N of the charge storage time for the image data.

Further, for example, in a case where N pieces of the blackout image data are to be generated, a time reduction ratio of the total charge storage time for the blackout image data is defined as R (0<R<1). In this case, the charge storage time for one blackout image data is preferably set to R/N of the charge storage time for the image data.

Furthermore, for example, in a case where N pieces of the blackout image data are to be generated, a time extension ratio of the total charge storage time for the blackout image data is defined as E(E>1). In this case, the charge storage time for one blackout image data is preferably set to E/N of the charge storage time for the image data.

Further, for example, it is also preferable that part or all of N pieces of the blackout image data are intentionally set to be different in the charge storage time. Especially in this case, by conducting equation approximation or analysis such as regression analysis regarding the relation on the time axis between the different charge storage times and generated fixed pattern noises, it is possible to determine linear or non-linear relation between the both. As a result, it is possible to more accurately estimate the fixed pattern noise corresponding to the charge storage time for the image data.

Step S3: In response to the instruction for generating the blackout image data, the image capturing control part 14 closes the shielding mechanism 12b to keep the light receiving surface of the image sensor 13 in a blackout state.

Step S4: The image capturing control part 14 drives the image sensor 13 in the blackout state and executes charge storage/image reading at least twice according to the generation schedule. The plural blackout image data generated at this time are stored in the memory 17 after sequentially processed in the signal processing part 15 and the A/D converter 16.

Step S5: The microprocessor 19 refers to pre-stored correspondence relation based on the charge storage time for the blackout image data and so on to determine set values L, J, K. These set values L, J, K are set in the image processing part 20 as parameters.

The set value L is a threshold value for use in discriminating a micro-level part, in the blackout image data, which obviously includes no fixed pattern noise. Such a set value L varies depending on a noise characteristic, the charge storage time, imaging sensitivity, and the like of the image sensor 13. Therefore, it is preferable to experimentally find the set value L in advance in correspondence to the charge storage time, the imaging sensitivity, and the like of the blackout image data.

Note that one of the following values is preferably adopted as the set value L.
  (a) a lower limit threshold value of the fixed pattern noise
  (b) an upper limit threshold value of random noise
  (c) the lower value of the above (a) and (b)

Further, when the plural blackout image data are different in the charge storage time or the imaging sensitivity, the set value L is preferably determined individually for each of the blackout image data.

The set value J is a threshold value for use in discriminating whether or not there is signal level correlativity among the blackout image data. Such a set value J varies depending on the noise characteristic, the charge storage time, the imaging sensitivity, and the like of the image sensor 13. Therefore, the set value J is preferably experimentally determined in advance in correspondence to the charge storage time, the imaging sensitivity, and the like of the blackout image data. As the set value J, it is preferable to adopt a value (such as a value according to a standard deviation α) statistically obtained from variation widths of the fixed pattern noises in the individual blackout image data (whose average signal levels are made uniform by being multiplied by a normalization coefficient if they differ in the charge storage time).

Further, the set value K is a value indicating a virtual signal level in the blackout image data B (to be described later) when there is no influence of the random noise. It is preferable to experimentally find the set value K in advance in correspondence to the total charge storage time, the imaging sensitivity, and so on of the plural blackout image data. Alternatively, a DC level or the like detected from the blackout image data obtained at Step S4 may be determined as the set value K.

Step S6: The image processing part 20 initializes a scan position [i, j] of the blackout image data to [0, 0] and reads a value of the scan position [i, j] of each of the plural blackout image data.

Step S7: The image processing part 20 judges whether or not the values of the scan position [i, j] in the plural blackout image data are all equal to or less than the set value L.

If the values of the scan position [i, j] in all the blackout image data are equal to or less than the corresponding set value L, the image processing part 20 judges that the scan position [i. j] is a micro-level part not including fixed pattern noise and shifts its operation to Step S9.

Otherwise, the image processing part 20 shifts its operation to Step S8.

Step S8: The image processing part 20 calculates a level difference (absolute value) of the scan position [i, j] among the plural blackout image data. If the number of the blackout image data is three or more, a difference between the maximum value and the minimum value of the scan position [i, j], a standard deviation of the values of the scan position [i, j], an average value of level differences between the individual blackout image data, or the like is preferably found as the level difference.

Next, the image processing part 20 judges whether or not the found level difference is less than the set value J.

Here, if the level difference is less than the set value J, the scan position [i, j] is a highly correlative part, and thus can be judged as the fixed pattern noise. In this case, the image processing part 20 shifts its operation to Step S10.

On the other hand, if the level difference is equal to or less than the set value J, the scan position [i, j] is a non-correlative portion, and thus can be judged as the random noise. In this case, the image processing part 20 shifts its operation to Step S9.

When the plural blackout image data are successively processed one by one, the first blackout image data has no comparison target for finding the difference, and therefore, the image processing part 20 preferably shifts its operation to Step S10 unconditionally. In this case, the judgment at Step S8 is started from the second blackout image data.

Further, as for the scan position whose value is determined as being equal to or less than the set value L in one blackout image data or more, the operation may shift to Step S9 from Step S7, skipping the judgment at Step S8. Such an operation can reduce the processing time.

Step S9: The image processing part 20 substitutes the set value K in the scan position [i, j] of the blackout image data B (preferably one of the blackout image data in the memory 17 for saving memory capacity). After this processing, the operation shifts to Step S11.

Step S10: The image processing part 20 adds the values of the scan position [i, j] in the plural blackout image data to find an addition value and stores the addition value in the scan position [i, j] of the blackout image data B.

Step S11: The image processing part 20 judges whether or not the scan of the blackout image data has been completed. If the scan has not been completed, the operation shifts to Step S12. On the other hand, if the scan has been completed, the operation shifts to Step S13.

Step S12: The image processing part 20 goes to the next scan position [i, j]. The image processing part 20 reads values of the new scan position [i, j] from the plural blackout image data. After this processing, the image processing part 20 returns its operation to Step S7.

Step S13: The image processing part 20 determines a compensation gain of the blackout image data B based on the sum total S of charge storage times BT of the blackout image data and on a charge storage time PT of the image data. If the level of the fixed pattern noise exhibits a linear change with respect to the charge storage time, the compensation gain may be determined as PT/S multiple. If the change is nonlinear, the compensation gain corresponding to S and PT (or BT and PT) may be found.

The image processing part 20 multiplies the blackout image data B by the found compensation gain to make the level of the fixed pattern noise substantially uniform between the blackout image data B and the image data.

Step S14: In each pixel, the image processing part 20 subtracts the blackout image data B from the image data in the memory 17. By this subtraction processing, the image data with reduced fixed pattern noise is obtained.

<<Effects Etc. of First Embodiment>>

As has been described above, in the first embodiment, the plural blackout image data are generated.

The fixed pattern noises in the plural blackout image data have high correlativity because of regular appearance thereof. On the other hand, the random noises in the plural blackout image data have non-correlativity because of irregular appearance thereof. Therefore, applying variation reduction to the part having non-correlativity among the plural blackout image data as in the first embodiment makes it possible to obtain the blackout image data with reduced random noise. Reducing image noise based on this blackout image data realizes the reduction in the fixed pattern noise with less influence of the random noise.

Further, in the first embodiment, the micro-level part where all the plural blackout image data have micro level is detected. The micro-level part is a part which cannot include the fixed pattern noise that is liable to increase level. Such a micro-level part is a part including only the random noise and can be considered as a part having a demerit rather than a merit in the removal of the fixed pattern noise. Therefore, applying variation reduction to the micro-level part makes it possible to further reduce the influence of the random noise. As a result, the reduction in the fixed pattern noise with less influence of the random noise is realized.

Since the influence of the random noise can be thus reduced, a tolerable amount of the random noise in the blackout image data is larger than in a conventional art. This can realize the setting of, for example, reducing the total charge storage time for the blackout image data. In this case, the electronic camera 11 can be freed from a photographing sequence of the blackout image data in a shorter time, which can realize the electronic camera 11 superior in usability.

<<Supplemental Matter of First Embodiment>>

In the above-described first embodiment, the fixed pattern noise is removed by the subtraction of the blackout image data from the image data. However, the first embodiment is not limited to this.

For example, the image processing part 20 evaluates the correlativity among the plural blackout image data to detect a part where highly correlative fixed pattern noise appears (or removes a part where non-correlative random noise appears to thereby detect a part where the fixed pattern noise appears). Next, the image processing part 20 applies the noise reduction processing to a pixel position in the image data corresponding to this appearance part, by referring to surrounding pixels or the like. Such processing makes it possible to accurately discriminate the fixed pattern noise and the random noise in the blackout image data based on a difference in correlativity therebetween. As a result, this processing can also reduce the influence of the random noise given to the image data.

In the above-described first embodiment, the non-correlative random noise is reduced by substituting the set value K in the non-correlative portion in the blackout image data. However, the first embodiment is not limited to this.

For example, when three blackout image data or more are generated, it is also possible to reduce the non-correlative random noise by image composition in which median calculation (median) is performed on the three blackout image data or more.

Further, for example, when three blackout image data or more are generated, the non-correlative random noise can be reduced also by image composition in which averaging is performed by excluding pixel values greatly different in level.

In the above-described first embodiment, the image data is first generated and thereafter the blackout image data are generated. However, the first embodiment is not limited to this. Part or all of the plural blackout image data may be generated before the image data is generated. Alternatively, part or all of the plural blackout image data may be generated at a timing independent from the photographing of the image data, such as at power-on time. By such an operation, the photographing sequence of the blackout image data after the image data is photographed can be reduced in time or eliminated.

In the above-described first embodiment, the electronic camera 11 (including the noise reducing device) is described. However, the first embodiment is not limited to this. For example, the noise reducing device may be structured independently from the electronic camera. Another possible example is to realize the above-described noise reduction processing (for example, shown in FIG. 2) by software and prepare an image processing program. Executing this image processing program by a computer can realize the noise reducing device on the computer.

The above first embodiment has described the case where the noise reduction processing is applied to the data generated by the electronic camera. However, the first embodiment is not limited to this. For example, the above-described noise reduction processing can be executed by using image data and blackout image data generated by an image generating device such as a scanner.

Noise reducing service in a server (image album server or the like) on the Internet may be provided by using image data and blackout image data transferred from a user.

Second Embodiment

Figure 3:
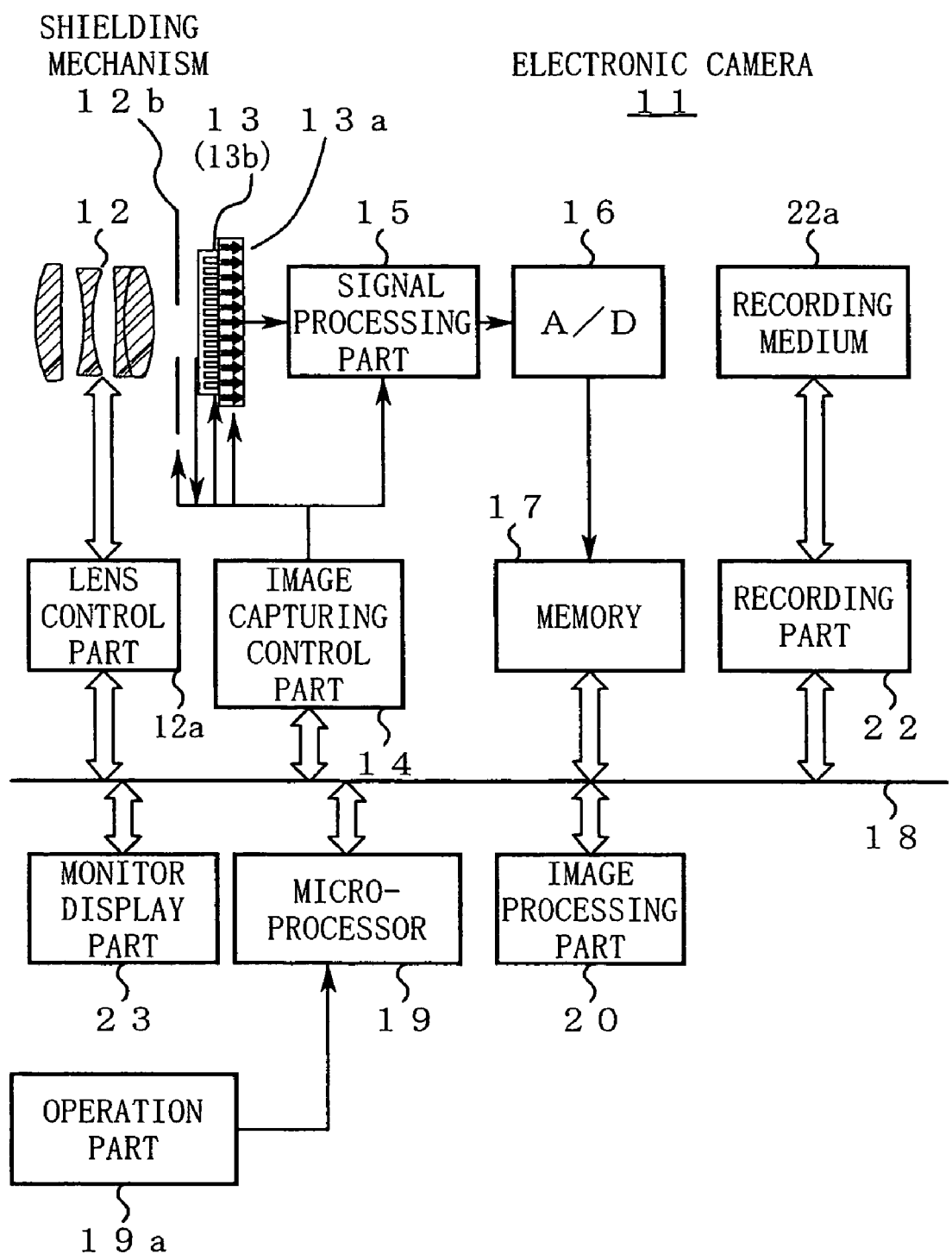
FIG. 3 is a block diagram showing an electronic camera 11s.

FIG. 3 is a block diagram showing an electronic camera 11s. Here in FIG. 3, the same reference numerals and symbols are used to designate the same components as those of the first embodiment (FIG. 1), and repeated description thereof will be omitted.

An image sensor 13 in the electronic camera 11s has an integrated temperature adjusting part 13a. An image capturing control part 14 drives the temperature adjusting part 13a to control the temperature of the image sensor 13.

Note that the temperature adjusting part 13a is preferably a mechanism capable of heating/cooling such as a Peltier element or a Carnot heat engine. Further, as the temperature adjusting part 13a, also preferable is a mechanism whose temperature can be raised, such as a resistor, an electric circuit, or a light emitter (such as a light emitting element for a monitor screen of the electronic camera 11s). The temperature adjusting part 13a may be formed as a circuit directly on a semiconductor substrate of the image sensor 13. Alternatively, the temperature adjusting part 13a may be integrated with a package of the image sensor 13.

Especially in the case of the Peltier element, it is preferably interposed between the image sensor 13 and the monitor screen (light emitting element), considering the arrangement relation of internal components of the electronic camera 11s. In such a structure, the use of the Peltier element to transfer heat of the light emitting element to the image sensor 13 can increase the temperature of the image sensor 13 in a short time.

Further, a temperature sensor 13b is provided in the image sensor 13 or in the temperature adjusting part 13a. Information on the temperature detected by the temperature sensor 13b is transmitted to the image capturing control part 14.

Note that a monitor display part drives the monitor screen (including the light emitting element).

<<Description of Operation of Second Embodiment>>

Figure 4:
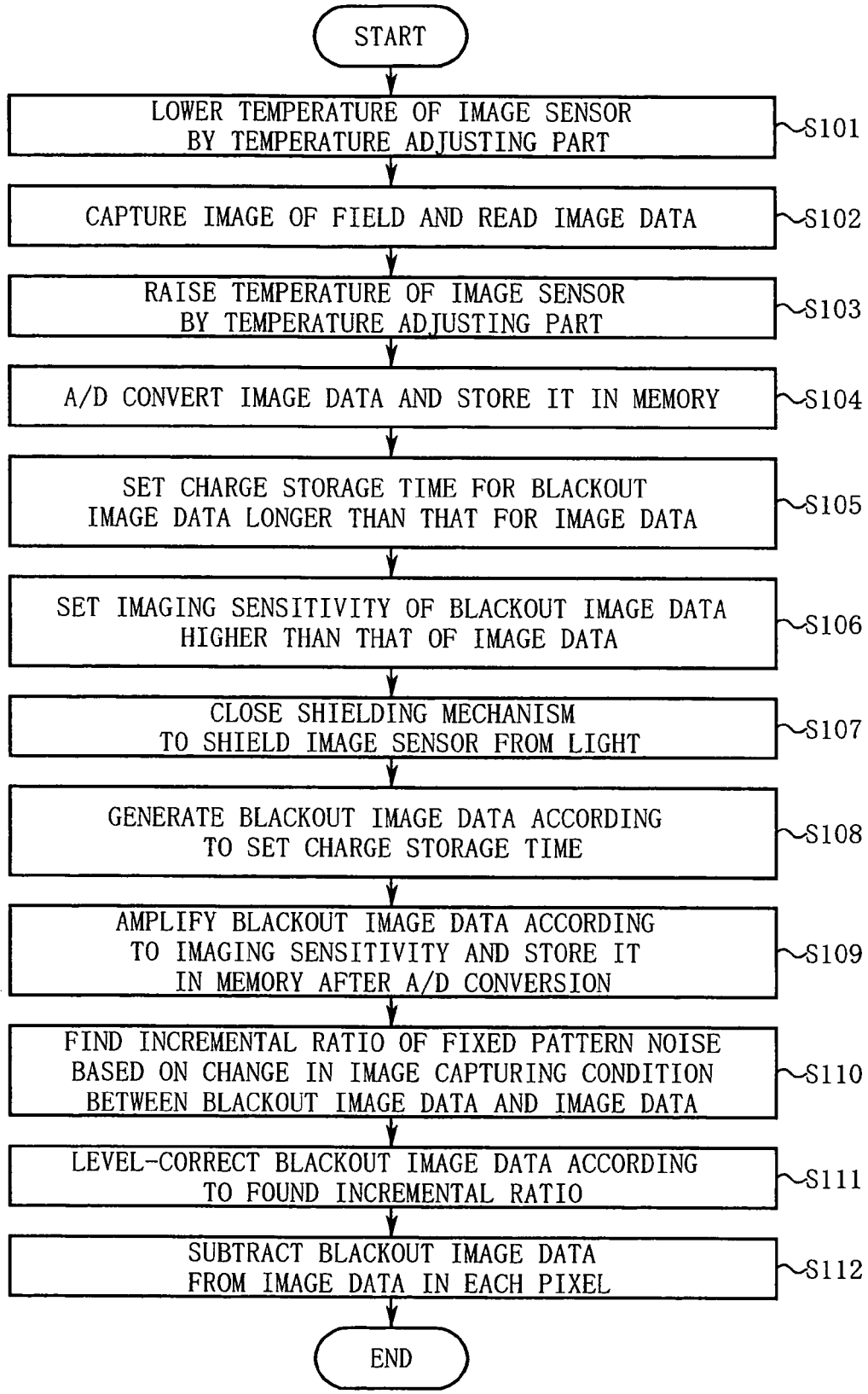
FIG. 4 is a flowchart to describe the operation of a second embodiment.

FIG. 4 is a flowchart to describe the operation of the second embodiment.

Hereinafter, the operation description will proceed following the step number shown in FIG. 4.

Step S101: When the temperature adjusting part 13a is an element capable of selecting heating or cooling, such as the Peltier element, the image capturing control part 14 preferably lowers the temperature of the temperature adjusting part 13a prior to an image capturing operation of a still image. The image capturing control part 14 detects the temperature at the time for photographing image data by the temperature sensor 13a to transmit this information to a microprocessor 19.

Step S102: The microprocessor 19, when detecting a user's release instruction in an operation part 19a or the like, instructs an image capturing condition (charge storage time, imaging sensitivity, and the like) of the image data to the image capturing control part 14. The image capturing control part 14 causes the image sensor 13 to start the photoelectric conversion of a subject image while keeping a shielding mechanism 12b open, and reads the image data from the image sensor 13 after the elapse of the instructed charge storage time.

Step S103: In preparation for the generation of blackout image data, the image capturing control part 14 drives the temperature adjusting part 13a to make the temperature adjusting part 13a start raising the temperature of the image sensor 13. At this time, preferably, the image capturing control part 14 causes the temperature sensor 13b to monitor the temperature and makes the temperature of the image sensor 13 rise to a predetermined temperature. The temperature after this rise is transmitted as information to the microprocessor 19 from the image capturing control part 14.

Step S104: A signal processing part 15 amplifies the read image according to the imaging sensitivity set for the image data. The image data, after being amplified, is digitalized in an A/D converter 16 and thereafter temporarily stored in a memory 17.

Step S105: The image capturing control part 14 sets a charge storage time for the blackout image data as long as possible, with the upper limit being the custom-set time for the electronic camera 11s (for example, additional time allowed for noise removal) or the like. The charge storage time is preferably set as long as possible within a time range (experimental value or the like) causing no saturation of the blackout image data (fixed pattern noise) inside the image sensor 13. By such setting, the charge storage time for the blackout image data is set longer than the charge storage time for most of image data.

Step S106: The image capturing control part 14 sets imaging sensitivity (signal gain) of the signal processing part 15 as high as possible within a range causing no signal saturation of the signal processing part 15 and the A/D converter 16. By such setting, the imaging sensitivity of the blackout image data is set higher than imaging sensitivity of most of image data.

Step S107: The image capturing control part 14 closes the shielding mechanism 12b to keep a light receiving surface of the image sensor 13 in a blackout state and a temperature risen state.

Step S108: The image capturing control part 14 stores charges in the image sensor 13 according to the charge storage time set at Step S105 and thereafter reads the blackout image data from the image sensor 13.

Step S109: The signal processing part 15 amplifies the generated blackout image data according to the imaging sensitivity set at Step S106. The blackout image data after being amplified is digitalized in the A/D converter 16 and thereafter is stored in the memory 17.

Preferably, as for the blackout image data at this stage, variation reduction is applied to a level range considered as random noise (non-fixed pattern noise) (generally, a low level range). Alternatively, a fixed value (a virtual signal level when the random noise is assumed not to occur) may be substituted in lieu of this level range. In this case, if a change of an image capturing condition does not cause a conspicuous change in the random noise, the level range considered as the random noise may be constant irrespective of the change of the image capturing condition. On the other hand, if the change of the image capturing condition causes a change in the random noise, the setting of the level range considered as the random noise is preferably changed according to the change of the image capturing condition.

Step S110: The microprocessor 19 obtains information on the image capturing condition of the blackout image data (here, charge storage time, imaging sensitivity, temperature, and the like) from the image capturing control part 14.

The microprocessor 19 refers to pre-stored correspondence relation based on a change in the image capturing condition between the image data and the blackout image data. By referring to this correspondence relation, the microprocessor 19 obtains information on a ratio of fixed pattern noise increase accompanying the change of the image capturing condition.

Note that this correspondence relation is prepared based on an experiment or simulation in which the relation of the change of the image capturing condition and the ratio of the fixed pattern noise increase accompanying the change is obtained.

Step S111: The microprocessor 19 selects a tone correction table for use in level correction according to this incremental ratio to transmit it to the image processing part 20.

The image processing part 20 level-corrects the blackout image data according to the selected tone correction table. In this level correction, the fixed pattern noise in the blackout image data is multiplied by a correction gain that is inversely proportional to the incremental ratio. As a result, the level of the fixed pattern noise in the blackout image data is lowered to become substantially equal to the level of the fixed pattern noise in the image data.

As for the blackout image data after the level correction, nonlinear variation reduction is preferably applied to the level range (generally a low level range) considered as random noise (non-fixed pattern noise). Further, a fixed value (a virtual signal level when the random noise is assumed not to occur) may be substituted in lieu of this level range. In this case, the setting of the level range considered as the random noise is preferably changed according to the change of the image capturing condition and the level correction following the change.

Step S112: In each pixel, the image processing part 20 subtracts the blackout image data, which has been level-corrected, from the image data in the memory 17. By this subtraction processing, the fixed pattern noise in the image data is reduced.

<<Effects Etc. of Second Embodiment>>

Hereinafter, effects of the second embodiment will be described.

(Effect of Extending the Charge Storage Time)

Figure 5:
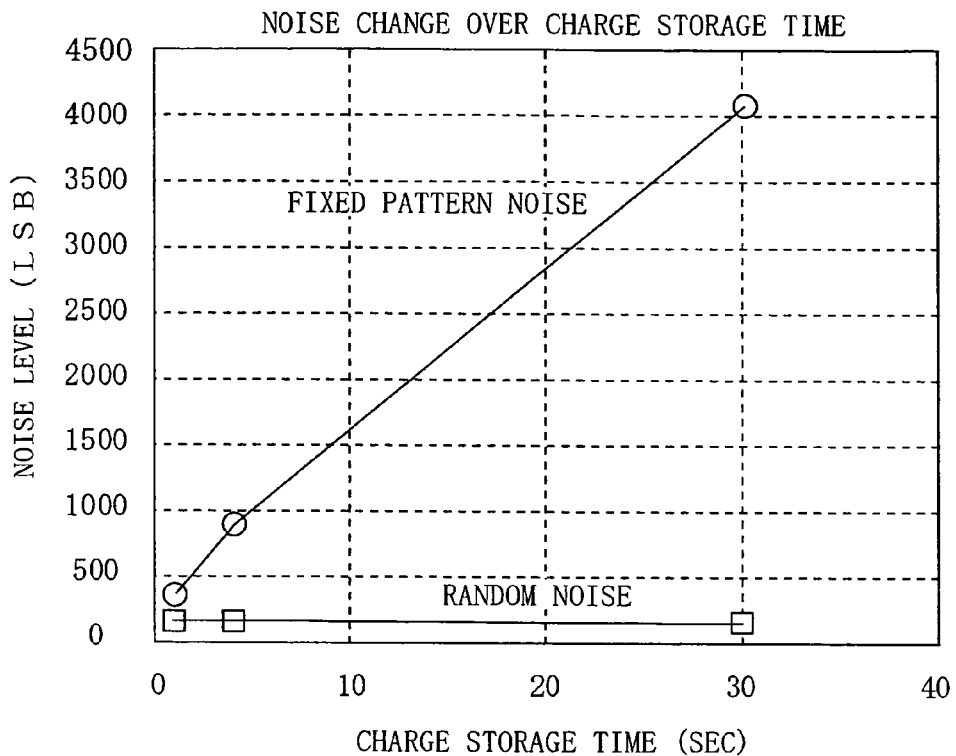
FIG. 5 is a chart showing the relation of the charge storage time vs. fixed pattern noise and random noise.

FIG. 5 is a chart showing the actually measured relation of the charge storage time vs. fixed pattern noise and random noise. As shown in FIG. 5, the noise level of the fixed pattern noise prominently increases in accordance with the increase in the charge storage time. On the other hand, the noise level of the random noise does not noticeably change even when the charge storage time gets longer.

Therefore, a level difference between the fixed pattern noise and the random noise can be increased by setting the charge storage time for the blackout image data longer than the charge storage time for the image data as in the second embodiment. The subsequent level correction of the blackout image data makes the noise level of the fixed pattern noise therein substantially equal to the noise level of the fixed pattern noise in the image data. At this time, in accordance with an increased amount of the level difference, the random noise in the blackout image data becomes smaller on the contrary.

As a result, less influence of the random noise is given in noise removal of the image data using the blackout image data which has been level-corrected, so that it is possible to obtain a good noise removing effect.

(Effect of Increasing Imaging Sensitivity)

Figure 6:
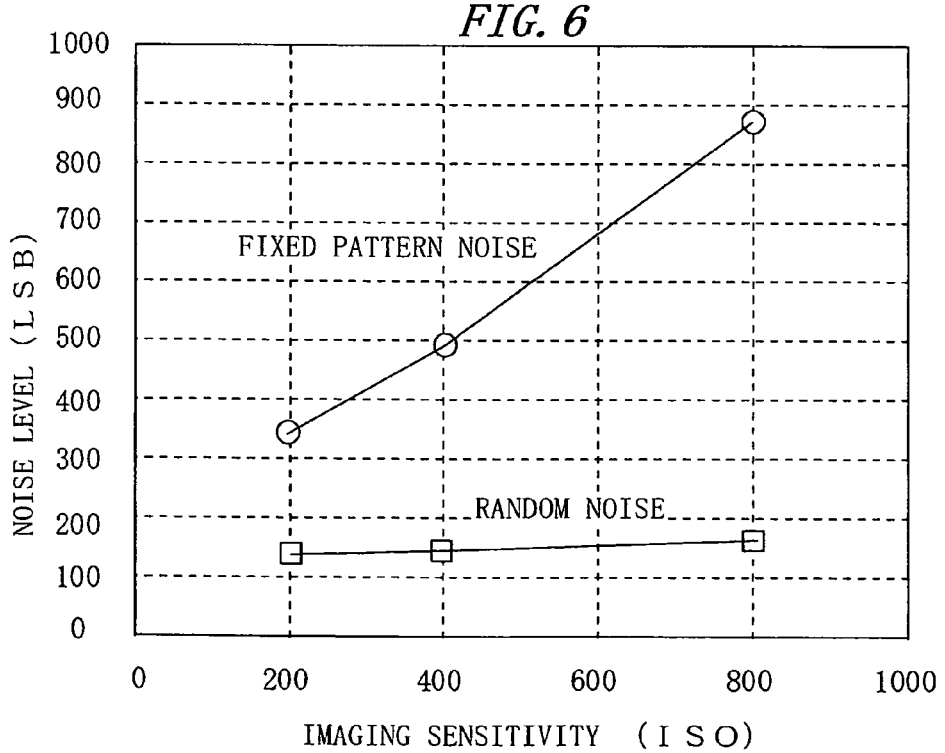
FIG. 6 is a chart showing the relation of imaging sensitivity vs. fixed pattern noise and random noise.

FIG. 6 is a chart showing the actually measured relation of imaging sensitivity vs. fixed pattern noise and random noise. As shown in FIG. 6, the noise level of the fixed pattern noise prominently increases according to the increase in the imaging sensitivity. On the other hand, the noise level of the random noise does not noticeably increase even when the imaging sensitivity gets higher.

Therefore, a level difference between the fixed pattern noise and the random noise can be increased by setting the imaging sensitivity of the blackout image data higher than the imaging sensitivity of the image data as in the second embodiment. The subsequent level correction of the blackout image data makes the noise level of the fixed pattern noise therein substantially equal to the noise level of the fixed pattern in the image data. At this time, in accordance with an increased amount of the level difference, the random noise in the blackout image data becomes smaller on the contrary.

As a result, less influence of the random noise is given in the noise removal of the image data using the blackout image data which has been level-corrected, so that it is possible to obtain a good noise removing effect.

(Effect of Temperature Increase)

FIG. 7 is a chart showing the actually measured relation of temperature vs. fixed pattern noise and random noise. As shown in FIG. 7, the noise level of the fixed pattern noise increases according to the increase in temperature. On the other hand, the noise level of the random noise does not noticeably increase even when the temperature gets higher.

Therefore, a level difference between the fixed pattern noise and the random noise can be increased by setting the temperature at the time of image capturing of the blackout image data higher than the temperature at the time of image capturing of the image data as in the second embodiment. The subsequent level correction of the blackout image data makes the noise level of the fixed pattern noise therein substantially equal to the noise level of the fixed pattern noise in the image data. At this time, in accordance with an increased amount of the level difference, the random noise in the blackout image data becomes smaller on the contrary.

As a result, less influence of the random noise is given in the noise removal of the image data using the blackout image data which has been level-corrected, so that it is possible to obtain a good noise removing effect.

(Synergistic Effect of a Plurality of Image Capturing Conditions)

Especially in the second embodiment, the changes in the plural image capturing conditions such as the charge storage time, imaging sensitivity, temperature, and the like work synergistically, so that it is possible to increase the level difference between the fixed pattern noise and the random noise in the blackout image data. Therefore, in accordance with a synergistically increased amount of the level difference, the random noise in the blackout image data can be reduced. Therefore, it becomes possible to synergistically reduce the influence of the random noise in noise removal of the image data using the blackout image data, which makes it possible to obtain a still better noise removing effect.

<<Supplemental Items of Second Embodiment>>

In the above-described second embodiment, the fixed pattern noise is removed by subtracting the blackout image data from the image data. However, the second embodiment is not limited thereto.

For example, in the above-described second embodiment, the level difference between the fixed pattern noise and the random noise in the blackout image data is increased in accordance with the change of the image capturing condition. Therefore, the image processing part 20 sets a threshold level within this level difference according to the image capturing condition of the blackout image data, which enables even more accurate discrimination of a part where the fixed pattern noise appears. The image processing part 20 applies noise reduction processing to a pixel position in the image data corresponding to this appearance part, by referring to surrounding pixels or the like. In this case, it is also possible to obtain a good noise removing effect with less influence of the random noise.

Further, in the above-described second embodiment, the plural image capturing conditions such as the charge storage time, imaging sensitivity, and temperature are changed when the blackout image data are generated. However, the second embodiment is not limited to this. At least one of the charge storage time, imaging sensitivity, and temperature may be changed.

Further, the image capturing conditions are not limited to these three kinds. Generally, any image capturing condition may be adopted providing that a change thereof can increase the level difference between the fixed pattern noise and the random noise.

In the above-described second embodiment, the image data is first generated and thereafter the blackout image data is generated. However, the second embodiment is not limited to this. The blackout image data may be generated first. Alternatively, the blackout image data may be generated at a timing independent from the generation of the image data (such as at power-on time) (in the above-described second embodiment, it is not necessary to make the image capturing conditions uniform, which makes it easier to generate the blackout image data at an independent timing). Such an operation can eliminate the photographing sequence of the blackout image data after the image data is photographed.

The invention is not limited to the above embodiments and various modifications may be made without departing from the spirit and scope of the invention. Any improvement may be made in part or all of the components.

What is claimed is:

1. An electronic camera comprising:
   an image capturing part generating image data by photoelectric conversion;
   a light shielding mechanism shielding said image capturing part from light;
   a control part that drives said image capturing part to capture an image of a field and generate image data, and drives said image capturing part shielded from light by said light shielding mechanism to generate blackout image data; and
   a noise reducing part that reduces fixed pattern noise in the image data according to the blackout image data, wherein
   for the blackout image data generation, said control part sets an image capturing condition under which a level difference between the fixed pattern noise and random noise increases, and
   said noise reducing part corrects a level difference of the fixed pattern noise between the blackout image data and the image data due to a change in said image capturing condition, and reduces the fixed pattern noise in the image data by subtracting the blackout image data from the image data after the level correction.

2. The electronic camera according to claim 1, wherein said control part increases the level difference between the fixed pattern noise and the random noise by setting a charge storage time for said blackout image data longer than a charge storage time for said image data.

3. The electronic camera according to claim 1, wherein said control part increases the level difference between the fixed pattern noise and the random noise by setting a signal gain (imaging sensitivity) of the blackout image data higher than that of the image data.

4. The electronic camera according to claim 1, wherein said control part has a function of adjusting temperature of said image capturing part, and increases the level difference between the fixed pattern noise and the random noise by setting the temperature in generating the blackout image data higher than in generating the image data.

5. The electronic camera according to claim 1, wherein said noise reducing part discriminates the fixed pattern noise from the random noise in the blackout image data according to a threshold level which is in accordance with the image capturing condition of the blackout image data, and reduces the fixed pattern noise in the image data according to the discriminated fixed pattern noise.

* * * * *